(12) United States Patent
Orion

(10) Patent No.: US 9,651,573 B2
(45) Date of Patent: May 16, 2017

(54) METHOD FOR CONTROLLING THE OPERATION OF A POSITIONING SYSTEM OF A TRAIN

(71) Applicant: Alstom Transport SA, Levallois-Perret (FR)

(72) Inventor: Jacques Orion, Vienne (FR)

(73) Assignee: Alstom Transport Technologies, Levallois-Perret (FR)

( * ) Notice: Subject to any disclaimer, the term of this patent is extended or adjusted under 35 U.S.C. 154(b) by 65 days.

(21) Appl. No.: 14/386,233

(22) PCT Filed: Mar. 20, 2013

(86) PCT No.: PCT/EP2013/055855
§ 371 (c)(1),
(2) Date: Sep. 18, 2014

(87) PCT Pub. No.: WO2013/139869
PCT Pub. Date: Sep. 26, 2013

(65) Prior Publication Data
US 2015/0293139 A1    Oct. 15, 2015

(30) Foreign Application Priority Data

Mar. 20, 2012  (FR) ...................... 12 52487

(51) Int. Cl.
*G01P 3/488* (2006.01)
*B61L 25/02* (2006.01)
(52) U.S. Cl.
CPC ............ *G01P 3/488* (2013.01); *B61L 25/021* (2013.01)
(58) Field of Classification Search
CPC .......... B61L 11/00; B61L 11/02; B61L 11/08; B61L 13/00; B61L 13/002; B61L 13/04; B61L 15/00; B61L 15/0018; B61L 15/0054; B61L 15/0072; B61L 25/00; B61L 25/02; B61L 25/021; B61L 25/023
USPC ..... 246/108, 110, 122 R–124, 167 R–169 R, 246/182 R, 185, 246, 247
See application file for complete search history.

(56) References Cited

FOREIGN PATENT DOCUMENTS

| DE | 10030487 A1 | | 12/2000 | |
|---|---|---|---|---|
| DE | 10333973 | * | 2/2005 | ............ H02K 29/06 |
| DE | 10333973 A1 | | 2/2005 | |
| DE | 102006047365 A1 | | 4/2008 | |
| EP | 0359422 A1 | | 3/1990 | |
| EP | 1475292 A1 | | 11/2004 | |

* cited by examiner

*Primary Examiner* — R. J. McCarry, Jr.
(74) *Attorney, Agent, or Firm* — Thompson Coburn LLP

(57) ABSTRACT

The invention relates to a method for controlling the operation of a positioning system (10) of a train, the system (10) including:
a toothed tone wheel (12),
three sensors (18, 20, 22) for detecting the presence of a tooth, arranged spatially so that six possible and different positions of the wheel (12) may be represented by six possible logic states of the three sensors (18, 20, 22), the six states being different,
the method including a step for:
detecting states corresponding to the signals delivered by the three sensors (18, 20, 22),
comparing the detected states with the values of the six logic states,
determining the operating state of the system (10) according to the comparison.

14 Claims, 3 Drawing Sheets

METHOD FOR CONTROLLING THE OPERATION OF A POSITIONING SYSTEM OF A TRAIN

CROSS-REFERENCE TO RELATED APPLICATIONS

This application is a 35 U.S.C. §371 application of PCT/EP2013/055855, filed Mar. 20, 2013, which claims the benefit of priority to French Application No. 1252487, filed Mar. 20, 2012, each of which is incorporated herein by reference in its entirety.

The present invention relates to a method for controlling the operation of a positioning system of a train. A railway vehicle is also proposed including a device suitable for applying the method.

In order to avoid that a collision between two trains occurs and to guarantee that the distance between two trains is sufficient, it is necessary to know the position of the train on the track. It is therefore desirable to have a train positioning system ensuring good safety.

Positioning systems of a train are known using a tone wheel connected to an axle. The wheel is toothed and cooperates with four sensors for detecting the presence of a tooth, the four sensors being borne by the vehicle. Three of the four sensors are arranged so as to be able to obtain a positioning of the train on the basis of the detection of the presence or of the absence of a tooth of the tone wheel. The fourth sensor is a so-called "consistency" sensor which controls proper operation of the positioning system when the train is moving. The fourth sensor is usually in phase with the first sensor. A test is also conducted at a standstill in order to ensure proper operation of the system.

However, this fourth sensor may fail. Further, the purchase of a fourth specific sensor and of a unit which may carry out the test at a standstill proves to be expensive. Consequently, it is desired to do without the use of this fourth sensor and of the unit conducting the test while guaranteeing the same reliability of the positioning system of a train.

Therefore there exists a need for a method for controlling the operation of a positioning system of a train which is easier to apply.

For this, the invention proposes a method for controlling the operation of a positioning system of a train, the system including a toothed tone wheel, a first sensor for detecting the presence of a tooth, a second sensor for detecting the presence of a tooth and a third sensor for detecting the presence of a tooth, the three sensors being spatially arranged so that at least six possible and different positions of the wheel may be represented by at least six possible logic states of the three sensors, the six states being different. The method includes a step for detecting states corresponding to the signals delivered by the three sensors.

The method also comprises a step for comparing the detected states with the six possible logic states, and for determining the operational state of the system according to the comparison.

According to other features of the invention, taken separately or as a combination:
- an operating abnormality of the system in the determination step is sent back when the detected state is not one of the six logic states.
- the switching from one logic state to another is governed by switching relationships and the method further includes a step for checking the compliance of the succession of detected states with the switching relationships,
- an operating abnormality of the system in the determination step is sent back when the succession of detected states is not compliant with the switching relationships,
- the six consecutive logic states are marked with successive integers, the switching relationships being $D2=(D1-1\pm1)[6]+1$ with D1 and D2 being the numbers of the detected states and [ ] is the mathematical modulo operation.
- each sensor has a duty cycle, the first sensor and the second sensor are shifted by a first shift relatively to a tooth in a direction of rotation, the second sensor and the third sensor are shifted by a second shift relatively to a tooth in the same direction of rotation each shift having the value of $120°\pm x$, x being comprised between 0 and 60°,
- the duty cycle of each sensor is comprised between $(180-x)/360$ and $(180+x)/360$,
- the step for detecting a state is triggered in the presence of a rising or falling edge on one of the three signals delivered by the sensors,
- the possible states are represented by a triplet of values corresponding to the logic states of the sensors,
- the logic states of the sensors comprise a high state and a low state,
- each triplet of values includes a rising or falling edge for a value, a high state or a low state for the other values, and
- the system further includes at least one detector of the operational state of the sensors and in which an operating abnormality of the system in the determination step is sent back when the detector detects a malfunction of one of the sensors.

The object of the invention is also a system further including at least one means for measuring the acceleration of the train and in which an operating abnormality of the system in the determination step is sent back when the acceleration measured by the measurement means is greater than a threshold value.

The object of the invention is also a positioning system of a train including a toothed tone wheel, a first sensor for detecting the presence of a tooth, a second sensor for detecting the presence of a tooth, and a third sensor for detecting the presence of a tooth, the three sensors being spatially arranged so that at least six possible and different positions of the wheel may be represented by at least six possible logic states of the three sensors, the six states being different.

The system also comprises a device for controlling the positioning adapted to apply the method as described earlier.

The invention also includes a railway vehicle including the positioning system as described earlier.

Other features and advantages of the invention will become apparent upon reading the detailed description which follows of the embodiments of the invention, given only as an example and with reference to drawings wherein.

Figure 1:
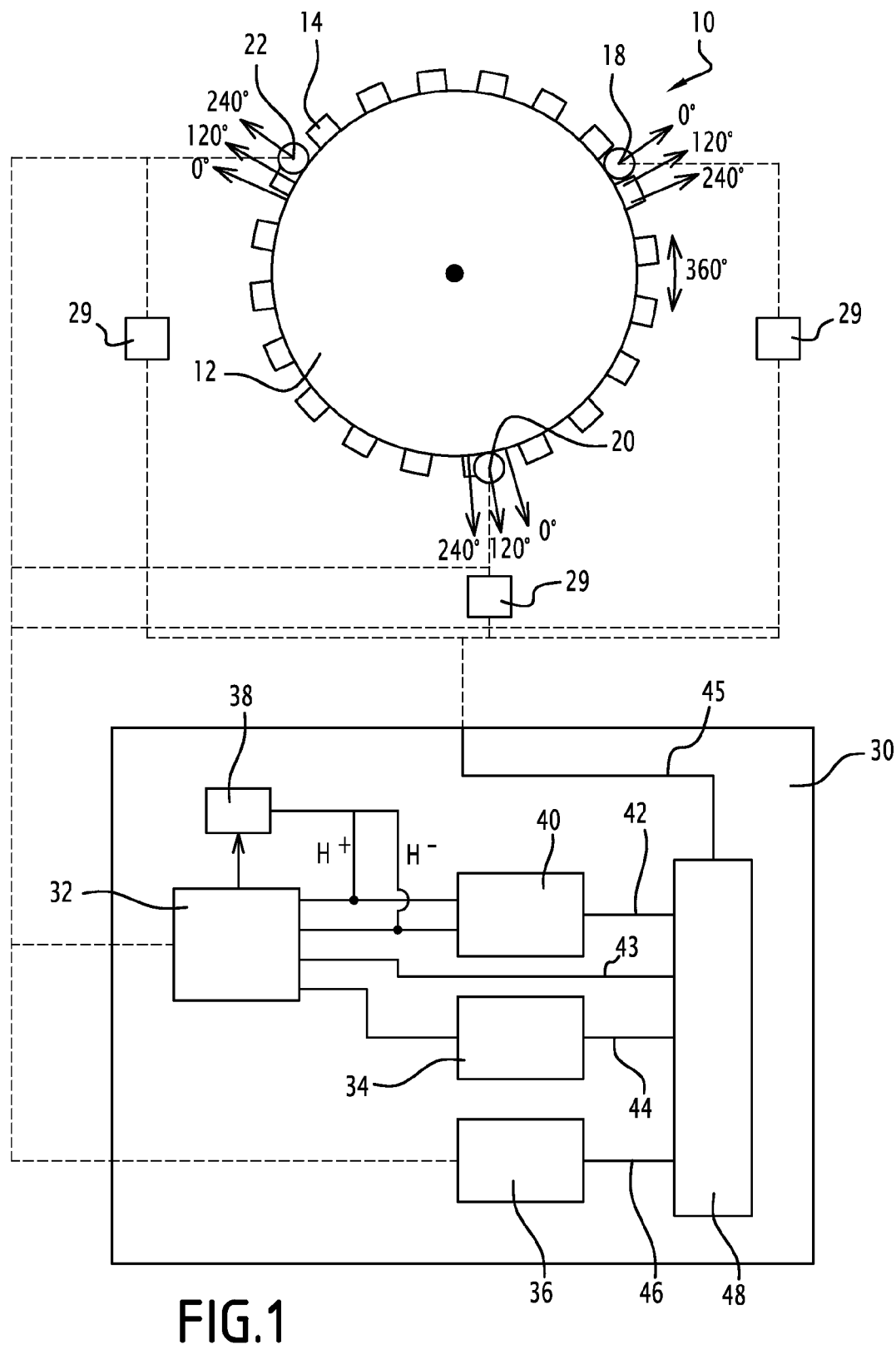
FIG. 1 shows a schematic view of an exemplary positioning system of a train.

A positioning system 10 of a train is schematically illustrated in FIG. 1. The system 10 includes a toothed tone wheel 12. The toothed tone wheel 12 is provided with teeth 14 spaced out angularly. In order to facilitate localization, certain teeth 14 are omitted on a portion of the periphery of the wheel 12. The wheel 12 is attached to a shaft of a train wheel. The wheel 12 is then secured to the train wheel. Both wheels therefore rotate at the same speed. The wheel 12 is thus representative of the motion of the train wheel.

The system also includes a first sensor 18, a second sensor 20 and a third sensor 22 for detecting the presence of a tooth 14. In the case of FIG. 1, the sensors 18, 20 and 22 are photodiodes. Any other sensor allowing the detection of the presence of a tooth 14 may be contemplated.

Figure 2:
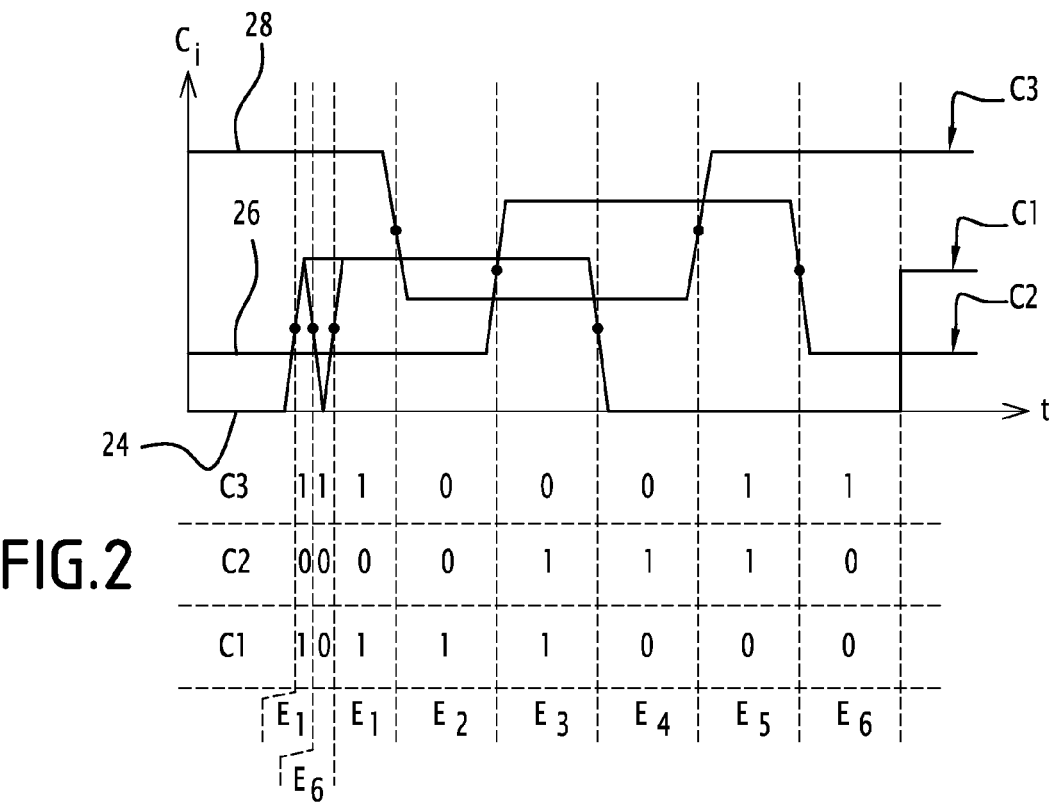
FIG. 2 shows a graph showing the time-dependent change in the signals delivered by the different sensors and the logic states of the associated sensors.

The three sensors 18, 20 and 22 deliver representative signals of the presence or of the absence of a tooth 14. The result of this is that each of the sensors 18, 20 or 22 has two logic states, one representative of the presence of a tooth 14 and the other representative of the absence of a tooth 14. The three sensors 18, 20 and 22 are fixed relatively to the train and therefore follow its movement. As the wheel 12 follows a rotary movement, the wheel 12 rotates relatively to the sensors 18, 20 and 22. The latter thus detect a succession of teeth 14 of the wheel 12 over time. This is schematically illustrated by FIG. 2. In this figure, the time-dependent change of the signals delivered by the different sensors 18, 20 and 22 is illustrated during normal operation of the wheel 12. More specifically, the curve 24 represents the time-dependent change in the signal delivered by the first sensor 18, the curve 26, that of the second sensor 20 and the curve 28, that of the third sensor 22. In order to improve clarity, the curves 24, 26 and 28 have been shifted upwards, it being understood that, in reality, the corresponding levels are substantially the same.

Upon examining the curve 24, it appears that the first sensor 18 may be found in two logic states depending on the relevant situation: a low state corresponding to the case of the detection of the absence of a tooth 14, a high state corresponding to the case of detecting the presence of a tooth 14. In the following, by noting as C1 the logic state of the first sensor 18, the low state corresponds to C1=0 and the high state to C1=1. Inverted logic is also possible, the developed ideas above remaining the same. Similarly, the second sensor 20 and the third sensor 22 each have two logic states: a low state and a high state. Further, by noting as C2 the state of the second sensor and C3 the state of the third sensor, C2=0 and C3=0 are the low states corresponding to detection of the absence of a tooth 14 while C2=1 and C3=1 are the high states corresponding to the detection of the presence of a tooth 14.

The three sensors 18, 20 and 22 are spatially arranged so that the six possible and different positions of the wheel 12 may be represented by six logic states of the three sensors 18, 20 and 22, the six logic states being different. A possible logic state is therefore the datum of the values of each signal delivered by the three sensors 18, 20 and 22. This corresponds to the datum of a triplet (C1, C2, C3). The result of this is that the datum of the triplet (C1, C2, C3) allows characterisation of a position of the wheel 12.

By observing FIG. 2, it appears that the position of the wheel 12 may be represented by six states. These six states are noted as $E_1$, $E_2$, $E_3$, $E_4$, $E_5$ and $E_6$. The state $E_1$ corresponds to the triplet (C1=1, C2=0, C3=1); the state $E_2$ to the triplet (C1=1, C2=0, C3=0); the state $E_3$ to the triplet (C1=1, C2=1, C3=0); the state $E_4$ to the triplet (C1=0, C2=1, C3=0); the state $E_5$ to the triplet (C1=0, C2=1, C3=1) and the state $E_6$ to the triplet (C1=0, C2=0, C3=1). The whole of the states $E_1$ to $E_6$ form the set of possible logic states of the three sensors 18, 20 and 22 for the different positions of the wheel 12. The set of the states may be represented as the following table 1, as this appears in FIG. 2:

TABLE 1

Logic values of the sensors 18, 20 and 22 according to the states of the wheel 12 (first embodiment).

| State | C1 | C2 | C3 |
|---|---|---|---|
| $E_1$ | 1 | 0 | 1 |
| $E_2$ | 1 | 0 | 0 |
| $E_3$ | 1 | 1 | 0 |
| $E_4$ | 0 | 1 | 0 |
| $E_5$ | 0 | 1 | 1 |
| $E_6$ | 0 | 0 | 1 |

The three sensors 18, 20 and 22 are spatially arranged so that the six possible and different positions of the wheel 12 may be represented by six different logic states of the three sensors 18, 20 and 22 when three conditions are met. The first sensor 18 and the second sensor 20 are shifted by a first shift D1 relatively to a tooth 14 in a direction of rotation (first condition); the second sensor 20 and the third sensor 22 are shifted by a second shift D2 relatively to one tooth 14 in a direction of rotation (second condition) and the third sensor 22 and the first sensor 18 are shifted by a third shift D3 relatively to a tooth 14 in a direction of rotation (condition 3). Depending on the relevant example, the direction of rotation is the clockwise direction of rotation of the needles of a watch (a so-called positive direction). Further, by convention, 360° corresponds to the deviation between two teeth of the toothed wheel, which implies that the sum of the three shifts is equal to 360°. This is mathematically written as D1+D2+D3=360°. As an example, the shifts D1, D2 and D3 are expressed in degrees and are comprised between 0 and 360°. Further, the three shifts D1, D2 and D3 are non-zero. This is mathematically written as: D1≠0, D2≠0 and D3≠0.

Thus, the third condition is also expressed by the fact that the sum of the first shift D1 and of the second shift D2 is different from 360°. This is mathematically written as D1+D2≠360°.

According to the example of FIG. 1, each sensor 18, 20 and 22 has the same duty cycle of 50%. Therefore, there exists a tolerance on the shifts D1, D2 and D3 which are known to within ±60°.

Vice versa, when the shifts D1, D2 and D3 are set to multiples of 60°; the duty cycle of the sensors 18, 20 and 22 varies between ⅓ and ⅔.

It is understood that between these two extreme cases, there exist compromises. Thus, if the shift D1, D2 and D3 is known to within ±30°, the duty cycle of the sensors is comprised between (180-30)/360=41.6% and (180+30)/360=58.3%.

More generally, for a shift known to within ±x°, the duty cycle of the sensors is comprised between (180-x)/360 and (180+x)/360.

Within the scope of the embodiment of FIG. 1, x is comprised between 0 and 60°.

Preferably, as this is the case for FIG. 1, the first shift D1 and the second shift D2 are 120°. This is mathematically written as D1=D2=120°. The result of this is that the third sensor 22 and the first sensor 18 are shifted by 120° relatively to a tooth 14 in the same direction of rotation. This is expressed by the mathematical equality D3=120°. This notably allows that a change in state indicates a movement by a sixth of a tooth 14. In order to schematically illustrate these three shifts D1, D2 and D3 equal to 120° in FIG. 1, the first sensor 18 is placed on an arrow corresponding to 0°, the second sensor 20 is placed on an arrow corresponding to 120° and the third sensor 22 is placed on an arrow corresponding to 240°.

The shifts D1, D2 and D3 of 120° may also be perceived in FIG. 2. Indeed, in the time domain, for teeth 14 which are regularly spaced out (50% duty cycle), this means that the signals delivered by the corresponding sensors 18, 20 and 22 are shifted by a third of a period. There actually exists a shift by a third of a period between the curve 24 and the curve 26; a third of a period between the curve 26 and the curve 28 and a third of a period between the curve 28 and the curve 24.

The signals delivered by the three sensors 18, 20 and 22 are signals utilized by a device 30 for controlling the positioning system. This device 30 is suitable for applying a method for controlling the operation of the positioning system 10 of the train.

The system 10 further includes an electric detector 29 for each sensor 18, 20 and 22, i.e. three detectors 29.

According to the operating mode of the sensors 18, 20 and 22, i.e. a voltage and/or a current mode, the detector 29 is able to detect open or short-circuited circuits. More specifically, in a voltage operating mode, a low state of the sensor 18 corresponds to a non-zero voltage, for example 5V while a high state of the sensor 18 corresponds to a voltage below the power supply voltage of the wheel, for example 15V if the wheel is powered with a DC voltage of 24V. Thus, if the detector 29 detects a voltage of 0V or a voltage of 24V, this means that the sensors 18, 20, 22 are not operating properly.

Alternatively, the detector 29 is able to detect a latent phase shift failure.

According to still another alternative, it is able to detect a latent failure of the duty cycle of the sensors.

Figure 3:
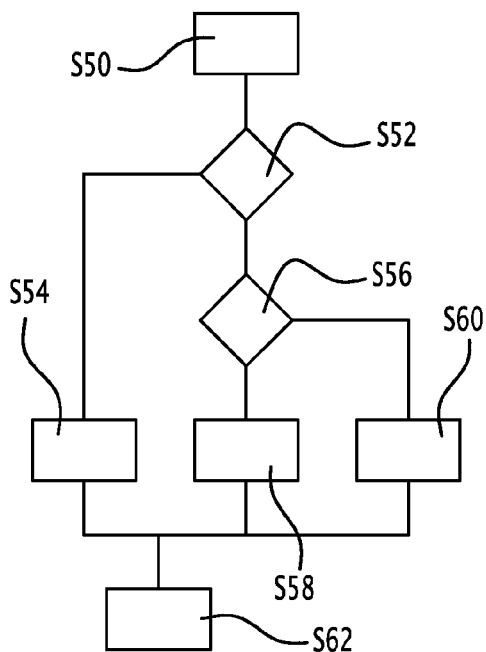
FIG. 3 shows a flowchart of an exemplary method for controlling the operation of a positioning system of a train.
Figure 4:
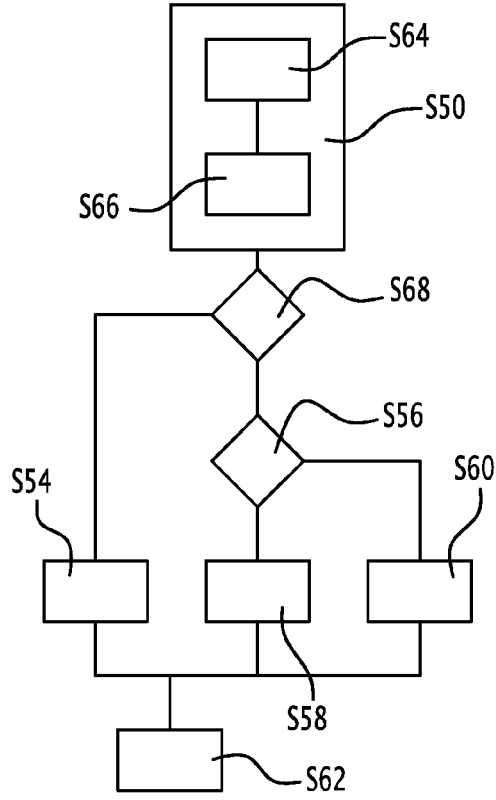
FIG. 4 shows a flowchart of another exemplary method for controlling the operation of a positioning system of a train.

As an example, the device 30 comprises a state machine 32 and a comparator 34. The state machine 32 is able to detect the different logic states of the detection sensors 18, 20 and 22. The state machine 32 is connected to the comparator 34 which is able to carry out comparisons between the states detected by the state machine 32 and pre-recorded states. The pre-recorded states depend on the relevant embodiment. With reference to FIGS. 3 and 4, three examples will be given. Further, the device 30 comprises a means 36 for calculating the angle between the sensors 18, 20 and 22 and the duty cycle of each of the signals delivered by the sensors 18, 20 and 22.

The device 30 also includes a calculation unit 38 calculating the so-called $H^+(n)$ and $H^-(n)$ values defined as:

$$H^+(n) = (\text{State}_n = E_n) \cdot (\text{State}_{n-1} = E_{(n-2)[6]+1}) \cdot (\text{State}_{n-2} = E_{(n-3)[6]+1}).$$

and $$H^-(n) = (\text{State}_n = E_n) \cdot (\text{State}_{n-1} = E_{(n)[6]+1}) \cdot (\text{State}_{n-2} = E_{(n+1)[6]+1}).$$

Wherein n is an integer varying between 1 and 6, the sign "·" is the sign of the logic operation "and", [-] designates a modulo and $\text{State}_n$ designates the state in which is the wheel.

According to the example of FIG. 2, upon switching to the state $E_1$, an oscillation in the detection of the first sensor 18 takes place. This is expressed by a rapid alternation of a rising edge, of a falling edge and of a rising edge in the signal of the curve 24. Thus, there is rapid switching from the state $E_1$ to the state $E_6$ and then a return to the state $E_1$. The advantage of the formulation of the values $H^+(n)$ and $H^-(n)$ as proposed, with a test on three successive states is to be able to ignore such phenomena (also called "glitches") in counting the turns. Actually, with the expressions above, neither the value $H^+(n)$ nor the value $H^-(n)$ passes to the logic state "1" in the presence of an oscillation of a sensor.

According to an example, the algebraic sum of these two values $H^+(n)$ and $H^-(n)$ is calculated in the wheel counter 40.

According to another example, the wheel counter 40 counts the number of occurrences of a "1" on both values $H^+(n)$ and $H^-(n)$.

These values $H^+(n)$ and $H^-(n)$ are used for determining the position of the train. It is known in the state of the art how to pass from eight successive values of $H^+$ and $H^-$ to the position of the train. It is actually possible to demonstrate the existence of a one-to-one correspondence between the eight values $H^+(n)$ and $H^-(n)$ and the positions of the train.

The values $H^+(n)$ and $H^-(n)$ also allow determination of the acceleration of the train.

Alternatively, in a more elaborate way, the system 10 includes six wheel counters, i.e. a wheel counter for each state $E_1$, $E_2$, $E_3$, $E_4$, $E_5$ and $E_6$ determining the number of passages per state. This gives the possibility of obtaining a measurement with lower noise and with six times more information. This alternative is particularly favourable for a train operating at a relatively slow speed.

As indicated by the lines 42, 43, 44, 45 and 46, the data respectively from the wheel counter 40 of the state machine 32, from the comparator 34 of the detector 29 and from the means 36 are led to a computer 48 which may interpret these data and if necessary determine the actions to be accomplished.

The computer 48 is thus capable of signalling an error on the states of the machine 32, of preventing a latent failure which for example will result from a wrong duty cycle for a sensor or issue a warning of too strong acceleration. A too large acceleration corresponds to an abnormal situation.

The flowchart of FIG. 3 schematically illustrates the application of an example of a control method by the device 30 according to a first embodiment.

The method comprises a step S50 for detecting states corresponding to the signals delivered by the three sensors 18, 20 and 22. The detection for example is accomplished by an acquisition at each change in states.

Alternatively, the acquisition is accomplished continuously. According to the example of FIG. 1, the acquisition is accomplished by the device 30. In the case of continuous acquisition, the differential system is used for detecting the changes in state. This avoids for slow operation that the conditions $H^+(n)$ and $H^-(n)$ are never met when the wheel has performed a complete revolution.

The method also comprises a step S52 for comparing the detected states with the values of the states of the set of possible states. In the example of FIG. 1, this means that it is checked whether three teeth-absence signals 14 or three teeth-presence signals 14 have been detected. By noting as $E_7$ and $E_8$ the corresponding states, the following table 2 giving the allowed and forbidden states is stored in memory in the comparator 34:

TABLE 2

Logic values of the sensors 18, 20 and 22 according to determined states (first embodiment) as well as their status.

| State | C1 | C2 | C3 | Status |
|---|---|---|---|---|
| $E_1$ | 1 | 0 | 1 | Allowed |
| $E_2$ | 1 | 0 | 0 | Allowed |
| $E_3$ | 1 | 1 | 0 | Allowed |
| $E_4$ | 0 | 1 | 0 | Allowed |
| $E_5$ | 0 | 1 | 1 | Allowed |
| $E_6$ | 0 | 0 | 1 | Allowed |
| $E_7$ | 0 | 0 | 0 | Forbidden |
| $E_8$ | 1 | 1 | 1 | Forbidden |

According to this embodiment, the pre-recorded states of the comparator 34 are the states $E_1$, $E_2$, $E_3$, $E_4$, $E_5$, $E_6$, $E_7$ and $E_8$. The comparator 34 compares the detected state to the eight aforementioned states. When the detected state is not one of the six allowed states, i.e. one of the states $E_1$, $E_2$, $E_3$, $E_4$, $E_5$ or $E_6$, an operating abnormality of the system 10 (step S54) is sent back and the computer 48 detects an abnormality. The comparison of step S52 is carried out for example by determining whether the detected state is part of the forbidden states.

The graph of FIG. 2 shows that the succession of logic states $E_1$, $E_2$, $E_3$, $E_4$, $E_5$ and $E_6$ is not arbitrary during normal operation. In this case, it is only allowed to switch from a state $E_n$ to a state $E_{n+1}$ or to a state $E_{n-1}$ depending on the direction of rotation of the wheel. Notably, switching from a step $E_n$ to a state $E_{n+2}$ is not allowed. The result of this is that the set of six logic states $E_1$, $E_2$, $E_3$, $E_4$, $E_5$ and $E_6$ is governed by switching relationships.

According to the example of FIG. 3, the method includes a step S56 for checking the compliance of the succession of the detected states with the switching relationships of the normal operation states of the system 10. This means that for both detected states $E_{D1}$ and $E_{D2}$ it is tested whether D2 is the sum of 1 with the expression D1 minus 1 plus or minus 1 modulo 6. This is expressed mathematically as:

$$D2=(D1-1\pm1)[6]+1 \quad \text{(relationship 1)}.$$

This relationship 1 may also be expressed in the form of two relationships.

$$D2=D1[6]+1 \quad \text{(relationship 2)}$$

or $$D2=(D1-2)[6]+1 \quad \text{(relationship 3)}$$

Wherein [ ] designates a modulo.

The relationships 2 and 3 are the two switching relationships for the first embodiment. They in particular imply that switching from the state $E_n$ to the state $E_{(n-3)[6]+1}$ is not allowed.

In the case when the succession of the detected states is not compliant with these relationships, in step S58, an operating abnormality of the system 10 is sent back. As an example, switching from the state $E_1$ (C1=1, C2=0, C3=1) to the state $E_4$ (C1=0, C2=1, C3=0) causes the detection of an operating abnormality in step S58. Indeed, 4=3+1 or 4=5-1, which implies that none of both relationships 2 or 3 is met.

According to the example of FIG. 3, the tests of the steps S52 and S56 are successive. Thus, if the comparison of step S52 leads to the detection of an abnormality, the test of step S56 is not conducted. During the test of step S56, either an abnormality is detected, which corresponds to step S58, or no abnormality is detected (step S60).

After the steps 54, 58 or 60, the method also includes a step S62 for determining the operation state of the system 10 depending on the comparisons which have been carried out. A malfunction is determined when an abnormality has been sent back in steps S54 or S58. If no abnormality is sent back, it is considered that the positioning system 10 is operating properly.

Step S62 is carried out, according to the example of FIG. 1, by the computer 48.

Alternatively, it is considered that the sensors 18, 20 and 22 emit three signals: the logic states Ci=0 and Ci=1 already mentioned and the rising/falling edges. In this embodiment, the rising/falling edges are considered as the only logic states. Table 1 is thus modified. For the sake of simplification, the new states are noted as $F_1$, $F_2$, $F_3$, $F_4$, $F_5$ and $F_6$. The step $F_1$ corresponds to the triplet (C1=rising or falling edge, C2=0, C3=1), step $F_2$ to the triplet (C1=1, C2=0, C3=rising or falling edge); step $F_3$ to the triplet (C1=1, C2=rising or falling edge, C3=0); step $F_4$ to the triplet (C1=rising or falling edge, C2=1, C3=0); step $F_5$ to the triplet (C1=0, C2=1, C3=rising or falling edge) and step $F_6$ to the triplet (C1=0, C2=rising or falling edge, C3=1). The whole of the states $F_1$ to $F_6$ form the set of possible logic states of the three sensors 18, 20 and 22 for the different positions of the wheel 12. The set of the states may be illustrated in the form of the following Table 3:

TABLE 3

Logic values of sensors 18, 20 and 22 depending on the wheel states 12 (second embodiment).

| State | C1 | C2 | C3 |
|---|---|---|---|
| $F_1$ | rising or falling edge | 0 | 1 |
| $F_2$ | 1 | 0 | rising or falling edge |
| $F_3$ | 1 | rising or falling edge | 0 |
| $F_4$ | rising or falling edge | 1 | 0 |
| $F_5$ | 0 | 1 | rising or falling edge |
| $F_6$ | 0 | rising or falling edge | 1 |

The flowchart of FIG. 4 schematically illustrates the application of an exemplary control method according to the second embodiment.

The method includes a detection step S50 which comprises a step S64 for acquiring the signals delivered by the three sensors 18, 20 and 22.

The detection step S60 also comprises a step S64 for filtering the acquired signals.

This step S64 is accomplished by only selecting the acquired signals in the presence of a rising or falling edge in one of the three signals delivered by the sensors 18, 20 and 22. This gives the possibility of keeping the same detected state $F_i$, at the control device 30 even in the presence of an oscillation of the signal delivered by the sensor 18, 20 or 22 during a transition between two states. This gives the possibility of avoiding the sampling constraints related to the presence of oscillations of the signal delivered by the sensor 18, 20 or 22.

In a preferred alternative, the acquisition step S64 only takes place for a change in state.

Figure 5:
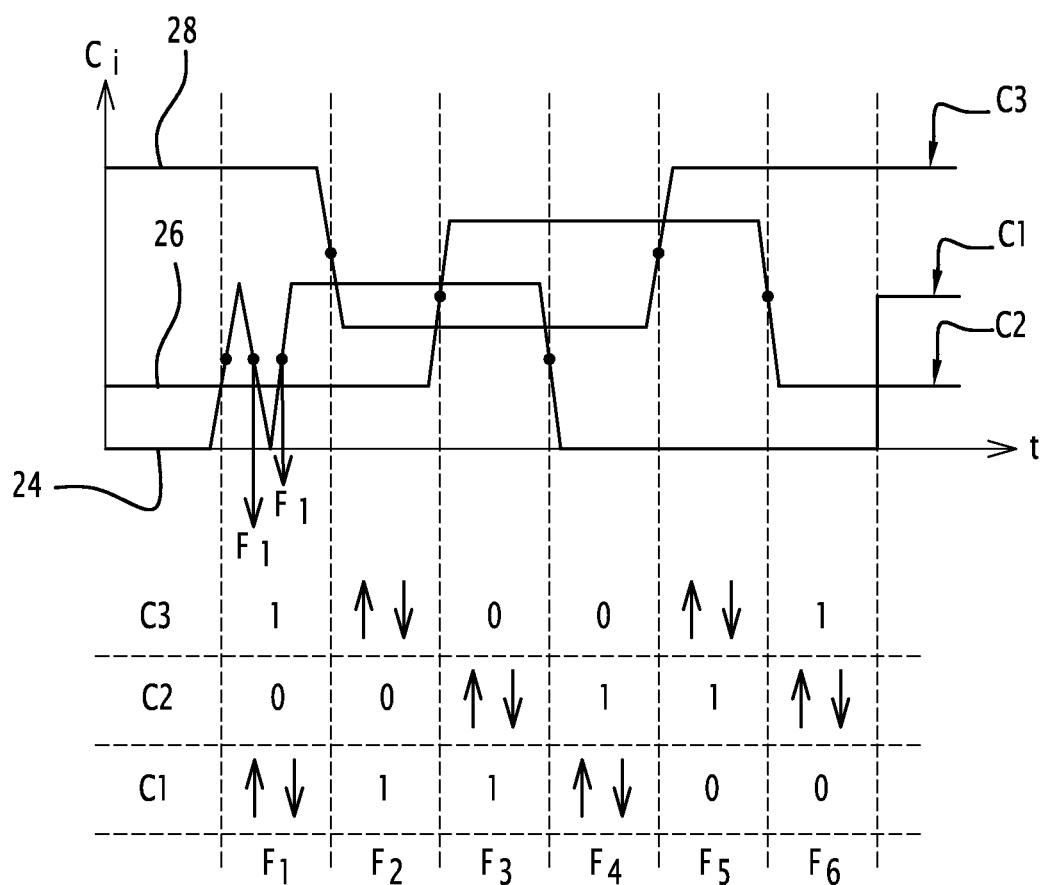
FIG. 5 shows a graph showing the time-dependent change of the signals delivered by the different sensors and logic states of the associated sensors.

According to the example of FIG. 5 which corresponds to that of FIG. 2, upon switching to the state $F_1$, an oscillation in the detection of the first sensor 18 takes place. This is expressed by a rapid alternation of a rising edge, of a falling edge and of a rising edge in the signal of the curve 24. Nevertheless, in detecting the states, as a rising edge or a falling edge corresponds to the same state $F_1$, this oscillation is not present.

The method proposed in this second embodiment is therefore not sensitive to the oscillations of the detection of the sensors 18, 20 and 22.

The method also comprises a step S68 for comparing the detected states with the values of the states of the set of possible states. Step S68 is similar to step S52 except that the forbidden states are different. The new Table 5 may thus be drawn up:

TABLE 4

Logic values of the sensors 18, 20 and 22 depending on the determined states (second embodiment) as well as their status.

| State | C1 | C2 | C3 | Status |
|---|---|---|---|---|
| $F_1$ | Rising or falling edge | 0 | 1 | allowed |
| $F_2$ | 1 | 0 | Rising or falling edge | allowed |
| $F_3$ | 1 | Rising or falling edge | 0 | allowed |
| $F_4$ | Rising or falling edge | 1 | 0 | allowed |
| $F_5$ | 0 | 1 | Rising or falling edge | allowed |
| $F_6$ | 0 | Rising or falling edge | 1 | allowed |
| $F_7$ | Rising or falling edge | 0 | 0 | forbidden |
| $F_8$ | Rising or falling edge | 1 | 1 | forbidden |
| $F_9$ | 0 | Rising or falling edge | 0 | forbidden |
| $F_{10}$ | 1 | Rising or falling edge | 1 | forbidden |
| $F_{11}$ | 0 | 0 | Rising or falling edge | forbidden |
| $F_{12}$ | 1 | 1 | Rising or falling edge | forbidden |
| $E_7$ | 0 | 0 | 0 | forbidden |
| $E_8$ | 1 | 1 | 1 | forbidden |

According to the second embodiment, the pre-recorded states of the comparator 34 are therefore different from the first embodiment. These are the states $F_1$, $F_2$, $F_3$, $F_4$, $F_5$ and $F_6$.

Finally, the method according to the second embodiment includes the same steps S54, S56, S58, S60 and S62 which are similar to those applied for the first embodiment. In particular, the test conducted in step S56 is the same. In other words, the switching relationships for the second embodiment are the ones of the first (relationships 2 and 3). Further, in the second embodiment, the values H+(n) and H−(n) are defined as:

$$H^+(n) = (\text{State}_n = F_n) \cdot (\text{State}_{n-1} = F_{(n-2)[6]+1}) \cdot (\text{State}_{n-2} = F_{(n-3)[6]+1}).$$

and $$H^-(n) = (\text{State}_n = F_n) \cdot (\text{State}_{n-1} = F_{(n)[6]+1}) \cdot (\text{State}_{n-2} = F_{(n)[6]+2}).$$

Alternatively, the method includes a step for detecting a halt of the train by no change in the logic state. This avoids wrong diagnostics giving a malfunction while the train is simply at a standstill.

According to another alternative, the method includes a step for determining the operating state of the system 10 on the basis of the data of the detectors 29. An abnormality is sent back when the detector 29 detects that the associated sensor 18, 20 or 22 operates in an open or short-circuited circuit.

According to another embodiment, the method includes a step for comparing the acceleration of the train with a threshold value. For example, this threshold value is 100 m·s$^{-2}$. When the measured acceleration is greater than the threshold value, an operating abnormality of the system 10 is sent back.

The method thus gives the possibility of safely handling the positioning system with its toothed tone wheel 12 and its three sensors 18, 20 and 22. In particular, the method ensures the detection of most abnormalities. Detectability of failures was thus verified to be $10^{-9}$ for detecting one, two or three "frozen" teeth 14, for detection of a parasitic interference between the signals delivered by two sensors 18, 20 or 22 inducing false detection for one or two teeth 14, for storage in memory of a state, for repeated storage in memory of a state and for detection of one, two or three random teeth 14. The only situation which is not detected with certainty is a stopping situation on a possible state. All the other failures are rapidly detected. Consequently, the method is well compliant with the safety standard SIL4.

Such a control of the operation of the positioning system 10 of the train avoids the use of a fourth sensor for detecting the presence of a tooth in order to carry out a consistency control. Further, the method allows suppression of the use of a test function intended for checking the proper operation of the three sensors.

The method is not sensitive to glitches of the sensors 18, 20 and 22.

The method also allows improvement in the accuracy on the position of the train at a standstill. The position is detected with six times better accuracy than when a consistency control with a fourth sensor is used.

The invention claimed is:

1. A method for controlling the operation of a system, the system including:
    a toothed tone wheel,
    a first sensor for detecting the presence of a tooth,
    a second sensor for detecting the presence of a tooth, and
    a third sensor for detecting the presence of a tooth,
        the three sensors being spatially arranged so that at least six possible and different positions of the wheel may be represented by at least six possible logic states of the three sensors, the six states being different,
    the method including a step for:
        detecting states corresponding to the signals delivered by the three sensors,
        comparing the detected states with the six possible logic states, and
        determining the operation state of the system according to the comparison, wherein an operating abnormality of the system is sent to a computer when the detected state is not one of the six logic states.

2. The method according to claim 1, wherein the system switches from a logic state to another of the at least six possible logic states in succession, the switches governed by switching relationships, and the method further including a step for checking the compliance of the succession of the detected states with the switching relationships.

3. The method according to claim 2, wherein the operating abnormality of the system in the determination step is sent to the computer when the succession of the detected states is not compliant with the switching relationships.

4. The method according to claim 2, wherein the six consecutive logic states are marked with successive integers, the switching relationships being D2=(D1−1±1) [6]+1 with D1 and D2 being the numbers of the detected states and [ ] is the mathematical modulo operation.

5. The method according to claim 1, wherein each sensor has a duty cycle, the first sensor and the second sensor are shifted by a first shift relative to a tooth in a direction of rotation, the second sensor and the third sensor are shifted by a second shift relative to a tooth in the same direction of rotation, each shift has the value 120°±x, x being between 0 and 60°.

6. The method according to claim 5, wherein the duty cycle of each sensor is between (180−x)/360 and (180+x)/360.

7. The method according to claim 1, wherein the step for detecting a state is triggered in the presence of a rising or falling edge on one of the three signals delivered by the sensors.

8. The method according to claim 1, wherein the possible states are represented by a triplet of values corresponding to the logic states of the sensors.

9. The method according to claim 8, wherein the logic states of the sensors comprise a high state and a low state.

10. The method according to claim 8, wherein each triplet of values includes a rising or falling edge for a value, and a high state or a low state for the other values.

11. The method according to claim 1, wherein the system further includes at least one detector for the operating state of the sensors and wherein the operating abnormality of the system in the determination step is sent to the computer when the detector detects a malfunction of one of the sensors.

12. The method according to claim 1, wherein the system is a positioning of a train, and the system further includes at least one means for measuring an acceleration of the train, and wherein the operating abnormality of the system in the determination step is sent to the computer when the acceleration measured by the measurement means is greater than a threshold value.

13. A positioning system of a train including:
   a toothed tone wheel,
   a first sensor for detecting the presence of a tooth,
   a second sensor for detecting the presence of a tooth,
   a third sensor for detecting the presence of a tooth, the three sensors being spatially arranged so that at least six possible and different positions of the wheel may be represented by at least six possible logic states of the three sensors, the six states being different, and
   a device for controlling the position adapted for applying the method according to claim 1.

14. A vehicle including the system of claim 13.

* * * * *